United States Patent
Beck et al.

(10) Patent No.: US 11,182,777 B2
(45) Date of Patent: Nov. 23, 2021

(54) SYSTEMS AND METHODS USING A PRIMARY ACCOUNT NUMBER TO REPRESENT IDENTITY ATTRIBUTES

(71) Applicant: IPSIDY INC., Long Beach, NY (US)

(72) Inventors: Philip Beck, Long Beach, NY (US); Thomas Szoke, Longwood, FL (US); Maxim Umarov, Longwood, FL (US); Paul Whittle, Long Beach, NY (US)

(73) Assignee: Ipsidy Inc., Long Beach, NY (US)

( * ) Notice: Subject to any disclaimer, the term of this patent is extended or adjusted under 35 U.S.C. 154(b) by 70 days.

(21) Appl. No.: 16/388,482

(22) Filed: Apr. 18, 2019

(65) Prior Publication Data

US 2020/0160329 A1    May 21, 2020

Related U.S. Application Data

(63) Continuation of application No. PCT/US2018/061308, filed on Nov. 15, 2018.

(60) Provisional application No. 62/586,695, filed on Nov. 15, 2017.

(51) Int. Cl.
| | |
|---|---|
| *G06Q 20/10* | (2012.01) |
| *G06Q 20/38* | (2012.01) |
| *G06Q 20/32* | (2012.01) |
| *G06Q 20/34* | (2012.01) |
| *G06Q 20/40* | (2012.01) |

(52) U.S. Cl.
CPC ..... *G06Q 20/3821* (2013.01); *G06Q 20/3278* (2013.01); *G06Q 20/355* (2013.01); *G06Q 20/3829* (2013.01); *G06Q 20/40145* (2013.01)

(58) Field of Classification Search
CPC ...... G06Q 20/3821; H04L 63/08; G06F 21/31
See application file for complete search history.

(56) References Cited

U.S. PATENT DOCUMENTS

| | | |
|---|---|---|
| 6,594,759 B1 | 7/2003 | Wang |
| 7,349,871 B2 | 3/2008 | Labrou et al. |
| 9,083,746 B2 | 7/2015 | Hamid |

(Continued)

OTHER PUBLICATIONS

International Search Report in PCT/US1861308, dated Feb. 11, 2019.
Written Opinion in PCT/US1861308, dated Feb. 11, 2019.

*Primary Examiner* — John W Hayes
*Assistant Examiner* — Sima Asgari
(74) *Attorney, Agent, or Firm* — John H. Choi & Associates

(57) ABSTRACT

A system and method is provided to register a user; assign a primary account number (PAN) to the user; create an account; create a unique cipher with keys; link, by a trusted source of identification, the PAN to an attribute of the user and to the account; receive the keys at a user device; remove the keys; generate data by a third-party to request the user to perform a transaction; present the PAN to the third-party; receive a transaction request detail; receive the data at a transaction processor based on a unique identifier of the PAN; identify the user using the unique identifier; authenticate the user; request, by the transaction processor, the device to release a key associated with the transaction request detail; decrypt stored information; and send a response, including the decrypted stored information, from the transaction processor to the third-party, thereby identifying the user.

18 Claims, 11 Drawing Sheets

(56) References Cited

U.S. PATENT DOCUMENTS

| | | | |
|---|---|---|---|
| 2002/0013904 A1* | 1/2002 | Gardner | G06Q 20/04 |
| | | | 713/184 |
| 2007/0291996 A1 | 12/2007 | Hoffman et al. | |
| 2008/0223932 A1 | 9/2008 | Mueller et al. | |
| 2012/0191615 A1 | 7/2012 | Schibuk | |
| 2014/0365366 A1 | 12/2014 | Spinella | |

* cited by examiner

SYSTEMS AND METHODS USING A PRIMARY ACCOUNT NUMBER TO REPRESENT IDENTITY ATTRIBUTES

CROSS-REFERENCE TO RELATED APPLICATIONS

This application claims priority to International Application No. PCT/US2018/061308, filed Nov. 15, 2018, which claims priority to U.S. Provisional Application No. 62/586,695, filed on Nov. 15, 2017. This application is also related to International Application No. PCT/US2016/046332, filed Aug. 10, 2016. The contents of those applications are incorporated herein in their entirety.

BACKGROUND

1. Field of the Invention

This invention is directed to the use of identification numbers, and in particular to systems and methods which use an Issuer Identification Number (IIN), such as those currently used in credit/debit card numbers, and personal account numbers, personal access numbers, or primary account numbers, abbreviated as PANs. The present invention operates in order to represent identity in a specific, anonymous manner that can be routed through existing systems such as payment systems. However, the present invention does not just rely on passing through payment systems. While it is not necessary to use existing payment systems, the present invention uses the same or similar techniques as current payment transaction techniques. The same IIN technique will use the same token or key to do other things, such as digital and physical access, and open routing of data and closed routing of data, with the numbers used for different purposes. The present invention does not use numbers for identifying accounts, but instead for identifying identities. A platform of the present invention could be a blockchain or a database associated with an authorization host. Encryption may be performed only after biometric identification. Furthermore, the present invention can have multiple keys, depending on which key is sent back by a user. As well, each block in a blockchain has its own element or key.

2. Description of the Prior Art

With the massive adoption of mobile devices as well as the rapid adoption of the Internet of Things, by which numerous everyday electronic devices are connected to the Internet and other networks, there is an increasing need for greater security for both physical and virtual applications.

Numerous driving forces present challenges, such as the daily friction of security vs. convenience, the increasing shift from physical to virtual transactions, the accelerating transition from the use of cash to electronic payments, the growing opportunities for fraud, and challenges of securing and monitoring physical perimeters.

A need exists for an identity and authentication network which addresses such challenges.

International organizations such as ISO are involved in setting the standards specifying a numbering system for the identification of card issuers operating within an interchange environment, that is to say an environment in which transaction data is exchanged between two or more participants. National and international organizations such as ANSI regulate and assign IINs, which are the first 8 digits of a primary account number (PAN), which are currently used for conducting financial transactions, for example, in credit or debit card numbers, as well as serving as identification numbers for an organization or entity. A PAN is the full number, which includes the IIN, an individual account number up to 10 digits and a final check digit generated by an algorithm to give a typical total of 16-19 digits. Previous use of PANs has been primarily for financial transactions, and PANs have been used to identify and route accounts, instead of identifying and routing individuals' identities.

A need exists for greater security and use of mechanisms for identity authentication. A need exists for identity attributes to be stored. A need also exists for merchant-to-consumer verticality where there is ubiquity for using transaction methods to verify identity using an existing infrastructure.

OBJECTS AND SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In the present invention, PANs are used and extended for the purpose of exchanging transaction data between participants relating to identity authentication and other identity events and transactions, not limited to financial transactions. The use of such extended PANs in conjunction with physical devices as the access point, such as beacons or gates to permit authenticated access to facilities, biometric devices to identify biometrics associated with the PAN for authentication by agents, not limited to merchants, and administrative structures such as web pages or computer portal screens, such as being in various languages not limited to English, for managing such extended PANs. As such, the identity of the user is embedded in transaction data. That is, PANs could be used for identity purposes, for accessing, monitoring, etc. using e.g., beacons which recognize a device of the PAN owner. Multiple privileges are available using a PAN. The PAN may be processed with the identity of the user, using biometric data such as a photo of the user's face taken by a camera of the user, for example, the camera of a smart phone, or may be processed with transaction data, such as data from any type of everyday event, to route the owner or individual associated with the PAN, instead of routing accounts.

In the present invention, the PAN of a user may also be used for identifying a user, without any data being released, as well as to be used to provide access, such as performing an interaction to open a door for a user and/or to authenticate a user, to trigger a door lock mechanism for entry of a user to a facility, as well as to trigger the ability to access a bank account of the user. Accordingly, the PAN is not limited to just releasing identity attributes of the user, which provide information regarding the user, but attributes may also be actionable items authorized by the user. For example, in response to a transaction from a partner entity which contains some form of data, after authentication of the user, approval is given for the user to engage in the transaction, which involves storing data received together with proof that authentication of the user has occurred. The interactions and communications involving the PAN may involve an application to access a facility, in which a beacon at the entry point of the facility triggers a trusted platform and identifies the application for access or entry.

A system and method are provided to register a user; assign a primary account number (PAN) to the user uniquely identifying the user; create an account associated with the user; create, in a system platform, a unique cipher with a set of keys for the PAN; link, by a trusted source of identification, the PAN to an attribute of the user and to the account associated with the user; receive the set of keys at a device associated with the user; remove the set of keys from the system platform; generate data by a third-party to request the user to perform a transaction; present the PAN of the user to the third-party; receive a transaction request detail from the third-party; receive the data at a transaction processor based on a unique identifier of the PAN; identify the user using the unique identifier of the PAN; authenticate the user associated with the PAN by a trusted platform using the linked attributes of the user; request, by the transaction processor, the device to release a key associated with the transaction request detail; decrypt, by the transaction processor, stored information using the released key; and perform an action identifying the user.

In one embodiment, the present invention is a method for performing the action by sending a response, including the decrypted stored information, from the transaction processor to the third party, thereby identifying the user. In another embodiment, performing the action includes sending an approval message authenticating the identity of the user, and retrieving additional details about the user from a database. In a further embodiment, performing the action includes storing the identity of the user, and performing a hash of the identity of the user. The attribute of the user may be biometric data. The device may be a physical card storing the PAN, which may be stored in a readable form selected from the group consisting of embossed indicia, a recorded magnetic strip, and data stored in an electronic chip. The device may be a mobile computing device including a memory storing the PAN, and a transmitter for transmitting the PAN to the transaction processor, and the mobile computing device is selected from the group consisting of an electronic fob, an electronic dongle, a cellular telephone, and a smartphone. The transaction is, for example, access to a physical gateway to allow the user to enter or to prevent entry of the user to a facility.

In another embodiment, the present invention is a system comprising: a system platform for assigning a primary account number (PAN) to the user uniquely identifying the user, for creating an account associated with the user, for creating a unique cipher with a set of keys for the PAN, and for linking the PAN to an attribute of the user and to the account associated with the user; a user device associated with the user for receiving the set of keys; and a transaction processor for receiving data based on a unique identifier of the PAN and for performing a transaction; wherein the system platform identifies the user using the unique identifier of the PAN, authenticates the user associated with the PAN using the linked attributes of the user; wherein the transaction processor requests the user device to release a key associated with a transaction request detail, and decrypts stored information using the released key; and wherein the system platform performs an action identifying the user. The transaction is, for example, access to a physical gateway to allow the user to enter or to prevent entry of the user to a facility. The device may be a physical card storing the PAN, with the PAN stored on the physical card in a readable form selected from the group consisting of embossed indicia, a recorded magnetic strip, and data stored in an electronic chip. The device may be a mobile computing device including a memory storing the PAN, and a transmitter for transmitting the PAN to the transaction processor, and the mobile computing device is selected from the group consisting of an electronic fob, an electronic dongle, a cellular telephone, and a smartphone.

In a further embodiment, the present invention is a non-transitory computer-readable storage medium storing instructions thereon for execution by a processor to: register a user; assign a primary account number (PAN) to the user uniquely identifying the user; create an account associated with the user; create, in a system platform, a unique cipher with a set of keys for the PAN; link, by a trusted source of identification, the PAN to an attribute of the user and to the account associated with the user; receive the set of keys at a device associated with the user; remove the set of keys from the system platform; generate data by a third-party to request the user to perform a transaction; present the PAN of the user to the third-party; receive a transaction request detail from the third-party; receive the data at a transaction processor based on a unique identifier of the PAN; identify the user using the unique identifier of the PAN; authenticate the user associated with the PAN by a trusted platform using the linked attributes of the user; request, by the transaction processor, the device to release a key associated with the transaction request detail; decrypt, by the transaction processor, stored information using the released key; and perform an action identifying the user. The transaction is, for example, access to a physical gateway to allow the user to enter or to prevent entry of the user to a facility. The device may be a physical card storing the PAN, with the PAN stored on the physical card in a readable form selected from the group consisting of embossed indicia, a recorded magnetic strip, and data stored in an electronic chip. The device may be a mobile computing device includes a memory storing the PAN, and a transmitter for transmitting the PAN to the transaction processor, and the mobile computing device is selected from the group consisting of an electronic fob, an electronic dongle, a cellular telephone, and a smartphone.

BRIEF DESCRIPTION OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE PREFERRED EMBODIMENTS

Certain terminology is used in the following description for convenience only and is not limiting. The article "a" is intended to include one or more items, and where only one item is intended the term "one" or similar language is used. Additionally, to assist in the description of the present invention, words such as top, bottom, upper, lower, front, rear, inner, outer, right and left may be used to describe the accompanying figures. The terminology includes the words above specifically mentioned, derivatives thereof, and words of similar import.

Figure 1:
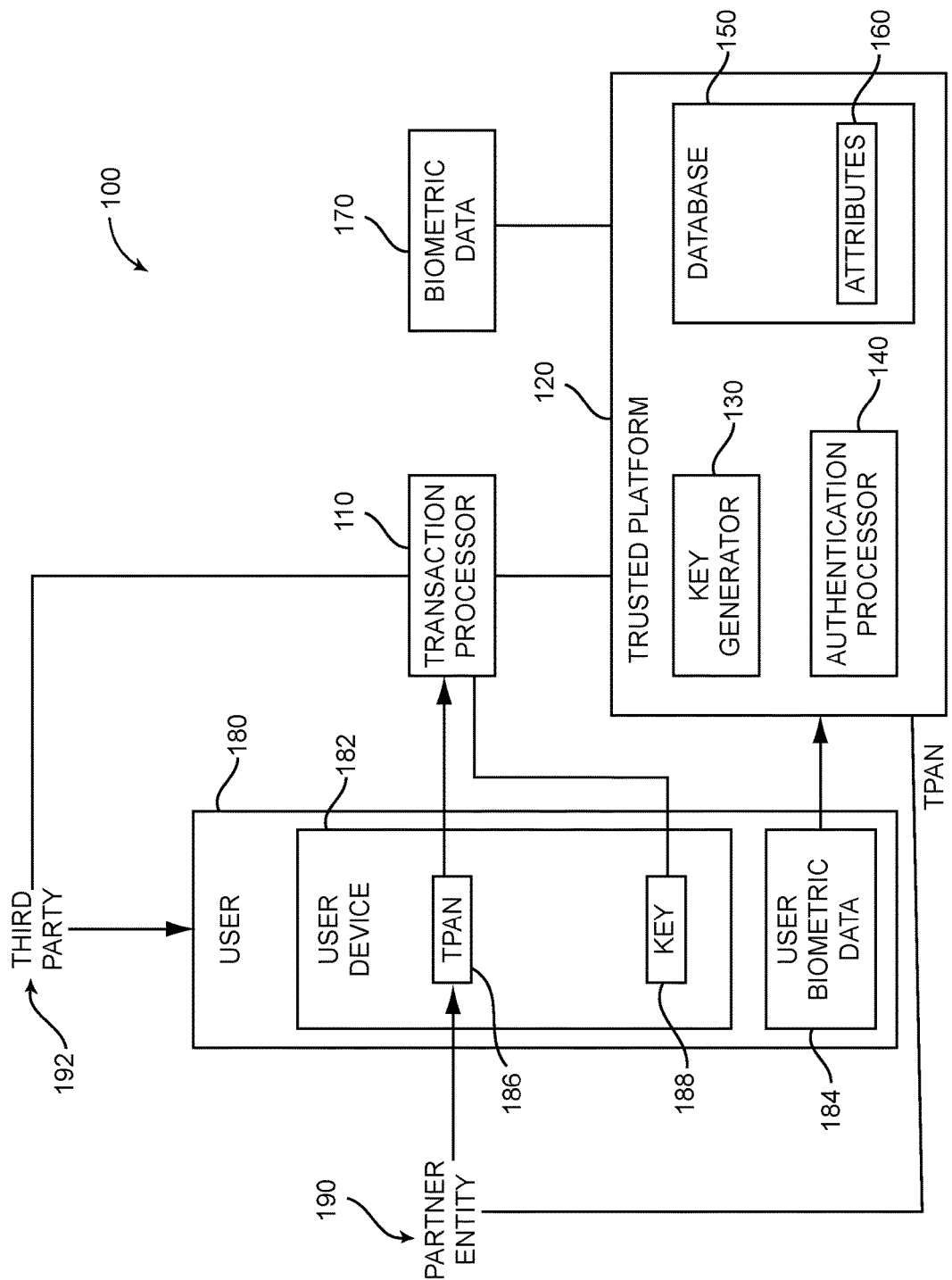
FIG. 1 illustrates a schematic of the system of the present invention.

As shown in FIG. 1, the system 100 and method of the present invention utilize PANs to identify and route individuals, unlike prior art systems and methods which identify and route accounts which are distinct from individuals. Referring to FIG. 1, the PAN of the present invention serves as a "token" and can also be "tokenized," and may be embodied on a physical medium, such as a physical credit, debit, or identification card, or embodied on a mobile computing device such as a cellphone or smartphone, as shown in FIG. 1 and described herein. As well, the "token" could be virtual and located, for example, in a database on a remote computer as a profile. The PAN of the present invention is hereinafter referred to as "PAN," "TPAN" or "tokenized PAN."

In one aspect of the invention, the TPAN 186 could be used to exchange value, for example, financial transactions, and could also be used to identify identity attributes. That is, the "token" can be used to trigger a look-up of attributes 160 on a trusted platform 120, and the attributes 160 are sent to the requestor with the consent of the individual. The present invention has the TPAN 186, as a token, having the general appearance of known industry card PANs, so that existing systems will automatically be able to route the TPAN 186 to a transaction processor 110 which can send the TPAN 186 to the trusted platform 120, thus triggering an identification transaction lookup and optional processing services, such as security and access control to electronic records. As an example, during a credit card transaction, the system 100 could flag the transaction and request the user to confirm his identity by other identification means, such as using biometrics 184 in FIG. 1 and described herein.

The systems and methods of the present invention include an extension of a Primary Account Number (PAN), by which a user has a collection of multiple TPANs 186 or tokens for different uses not limited to financial transactions, such as using a PAN to physically access facilities such as an office; to set permissions to release personal information such as medical records to doctors; to use a PAN for commencing telephone calls; and to use a PAN to manage various accounts such as E-mail accounts, bank accounts, and medical records.

The system 100 has a transaction processor 110 operatively coupled to a trusted platform 120, with the system 100 and method operating to grant or deny access to a user, such as physical access to a facility, or access to various transactional accounts and information, such as bank accounts, medical records, etc. The transaction processor 110 may be or may include a microprocessor and/or an integrated circuit. The trusted platform 120 includes a key generator 130, an authentication processor 140, and a database 150 which stores attributes 160 and biometric data 170 of users. The trusted platform 120 may include a blockchain for ensuring security of the data on the platform 120. The trusted platform 120, also known as a digital issuance platform, could be written in the "JAVA" programming language, but other programming languages can be used. Although companies such as "IPSIDY, INC." may operate the digital issuance platform, various third-party entities could alternatively provide the digital issuance platform, and application programming interfaces (APIs) may also be used to provide the functionality of a digital issuance platform. In an embodiment, the trusted platform 120 stores user records in a database using MySQL. The authentication processor 140 may be or may include a microprocessor and/or an integrated circuit. The trusted platform 120 also generates the PAN, which may be a tokenized PAN (TPAN) associated with the identity of the user 180, and which is provided to the partner entity 190 which, in turn, provides the TPAN 186 to the user device 182 associated with the user 180.

A user 180 has, owns, and/or is associated with a user device 182 and user biometric data 184. The user device 182 stores the TPAN 186 and a set of cryptographic keys 188 associated with a cipher. As shown in FIG. 1, a partner entity 190 queries the trusted platform 120 and receives the tokenized PAN 186, which uniquely identifies the user and associates the user with the partner entity, and assigns a unique PAN 186 to each user 180. A third party 192 communicates with the transaction processor 110 and with the user 180 to transfer data such as transaction data and data requests. The user 180, who may be a customer, consumer, or other entity, normally receives a tokenized PAN (TPAN) 186 which would have the same IIN routing number, which would be unique to the identity of the user/customer/consumer, and would also be unique to the partner entity 190 which queried for and which received the TPAN 186 from the trusted platform 120. Different PANs may identify different attributes, and there may be many different tokenized PANs used by the same user but all of which relate to the same user. That is, different PANs can be used to identify the same user, unlike financially-based account numbers in the prior art. For example, in one embodiment, different encryption keys 188 are associated with different tokenized PANs for attributes. It is to be understood that PANs are not necessarily associated with accounts, but instead are associated with the identities of users.

An individual has a unique identity that comprises several attributes, with some attributes obtained at birth, while other attributes are created during the lifetime of the individual. Each individual's attributes could include, for example, birth place, mother's maiden name, names of schools attended, names of siblings, etc. The combination of these factors allows the individual to be distinguished from others in society, hence allowing individuals to conduct transactions which represent only their benefit. The present invention associates a unique PAN with the individual that can be used for identification of the individual, as a basis of authorizations of the individual to access facilities or to access data, and as a method to retrieve the attribute information of the individual when required but with the control and consent of the individual.

The present invention also provides the ability for an individual to share his/her PAN over proprietary and open networks. To allow such sharing to safely occur, the PAN must be structured to accommodate the requirements of open networks. A PAN includes up to, for example, nineteen digits, with certain digits required to be the same across different PANs, while other digits are allowed to vary to create a unique identifier for every individual. A single PAN of an individual, in conjunction with the irrefutable consent of its registered owner, can be used to securely and with anonymity retrieve a single attribute or multiple attributes of the individual, and to provide the attributes to a requesting third party.

First, an individual 180 is registered in the system 100, then a unique identifier in the form of a PAN 186 is created and associated with the registered individual 180, and an electronic account or credential is created and associated with the registered individual 180 and the PAN 186. Next, a unique cipher with a set of keys 188 is created for the issued PAN 186. Using a trusted source of identification, such as a driver's license, a passport, an identification (ID) card, etc., the PAN 186 is linked to the individual's biometric identity, such as the user biometric data 184 which is stored in a separate database as biometric data 170, and linked to the electronic account or credential associated with that individual 180. Alternatively, the biometric data may be stored in the database 150 as the biometric data 170. Attributes 160 from the trusted identification source are extracted and stored in the database 150, and encrypted using the unique cipher and keys 188. Upon PAN linkage to the individual's biometrics 184, stored in the database 150 as biometric data 170, the keys 188 of the unique cipher are downloaded into the device 182 of the individual 180, and the keys 188 are then removed from the trusted platform 120. Additional attribute data 160 can be added anytime by the individual 180 associated with a PAN 186 and with his/her biometrics 184. All attribute data 160 stored in the system 100 is then disassociated from the identity of the individual 180 and from his/her PAN 186, hence making the system 100 fully anonymized.

When an individual 180 is asked by a third party 192 to perform a current transaction, such as to verify the individual's identity, the individual 180 presents his/her PAN 186 to the party 192, which may then use the transaction processor 110. The third party 192 requesting the transaction inputs a transaction request detail, such as a request for age verification, for example, whether the individual 180 is 21 years old or older; a request for address verification; a request for login information such as a user name and/or password to log into a computer; a request for a door access token, etc.

The transaction request and related data are routed to the transaction processor 110 using the unique characteristics of the PAN 186 of the individual 180, such as encoded attributes of the individual 180 included in the PAN 186. The PAN 186 may be a tokenized PAN (TPAN), which is provided to the partner entity 190 by the trusted platform 120. The individual 180 is then identified by the PAN 186 using the unique characteristics of the PAN 186, and the individual 180 is authenticated by the authentication processor 140 using the biometric data 170 of the individual 180 which has been previously stored in the database 150.

Upon successful authentication of the individual 180, the transaction processor 110 sends a request to the corresponding device 182 of the individual 180 associated with the PAN 186. The request is for the individual's device 182 to release the cipher key 188 associated with the transaction request detail. The transaction processor 110 uses the released cipher key 188 to decrypt the stored data from the database 150 for retrieving only the information requested for the current transaction. The transaction processor 110 then performs an action, such as sending a response to the requesting party 192 containing the decrypted information, and the transaction processor 110 then deletes the cipher key received from the corresponding device 182 of the individual 180 associated with the PAN 186.

Alternatively, performing the action includes sending an approval message authenticating the identity of the user, and retrieving additional details about the user from the database 150, such as attributes 160 or biometric data 170 accessible to the trusted platform 120. In another alternative embodiment, performing the action includes storing the identity of the user, such as in the database 150, and performing a hash of the identity of the user to encrypt the identity of the user in the database 150 for later use in authenticating the user.

In various embodiments, the user device 182 may be a credit card, a debit card, a loyalty card, or other physical devices with the PAN 186 embossed on and/or encoded on the device or card such as by a computer chip or a magnetic strip, with the PAN 186 capable of being read by an appropriate reader, for transmission to the transaction processor 110. It is to be understood that PANs are not necessarily associated with accounts, but instead are associated with the identities of users. Alternatively, a partner entity 190 may have a unique number scheme which is linked or mapped to the PANs 186, as shown in FIG. 1.

Alternatively, the user device 182 may be a mobile computing device such as an electronic fob or dongle, a cellular telephone, a smartphone, or other mobile electronic devices storing the PAN 186 therein and capable of transmitting the PAN 186 in a compatible electronic format to the transaction processor 110.

In another alternative embodiment, the user device 182 may be a remote computer such as a personal computer, a personal computing device such as a tablet, a server, a smartphone, or other electronic devices capable of storing and accessing the PAN 186, and transmitting the PAN 186 to the transaction processor 110.

In the present invention, the PAN 186 starts with a specific IIN, and uses the individual account number portion of the PAN and other standard industry techniques applicable to the ANSI scheme, to apply the PAN 186 to represent separate identity attributes each represented by a unique number, such as address, age, name, social security number (SSN), facial data, or other biometric attributes, etc., or the entire PAN represents an encryption key. ANSI must know that there is an interchange component in order to assign an IIN, as part of a revenue sharing arrangement, which allows for interchanges and interactions so that the sharing of fees is possible. The PAN is tokenized to be a TPAN 186 so that exposed PANs are more secure. Tokenization may be performed on the PAN by extracting an IIN therefrom, and jumbling or otherwise randomizing the numbers of the PAN to generate the TPAN 186.

The PAN 186 may also be used to represent temporary links to attributes in trusted third-party identity databases, similar to the trusted platform 120 with the database 150 having attributes 160 as in FIG. 1. Referring again to FIG. 1, the trusted platform 120, using either an access token or an identity token to represent the user, can read a directory listing of available attribute resources in the trusted third-party identity database for authentication and/or confirmation of the user. In another embodiment, the authentication processor 140, which may be an integrated user authentication system such as "IDLOK" available from "IPSIDY, INC.", generates the consent confirmation required to provide access to a user's attributes in a third-party identity database. The authentication processor 140 may be implemented as an application or app such as a native Java app, and which may also be an Android-based app. The authorized list of identity attribute resources is able to be viewed by the user. The user can select the identity attribute to be represented by a generated PAN which will be released to a third party with the consent of the user, such as, for example, releasing a prescription or drug card to a pharmacy while the user is trying to obtain medicine during a purchase transaction.

Another aspect of the invention is the general proposition of storing a merchant's customer's personal identification information (PII) and giving the PII back to the merchant with the customer's consent. This is would either comply with or render moot the Payment Card Industry (PCI) Data Security Standard which requires that account numbers of payment cards are not to be stored or that account numbers of payment cards are to be encrypted if stored. With the present invention, merchants need not store any of the customers' PII.

The European Union has addressed this issue with its General Data Protection Regulation (GDPR) rules, which came into effect in March 2018. The present invention would be a solution complying with the GDPR rules, so that the owner of the data can move the data to another merchant and have more control over the transferred data.

The systems and methods of the present invention also include the use of such extended PANs or tokens to trigger transactions such as with any merchant or agent from anywhere in the world, with identification and/or authentication by a third-party to a device, and return a message and/or PII information to the merchant or agent or any third-party to complete the transaction.

For example, when a child wishes to make a transaction, an alert could be sent to a parent's mobile device so that the parent could verify the child's identity and approve the transaction. As another example, when a spouse wishes to make a transaction, the other spouse could be alerted to approve the transaction.

The systems and methods of the present invention further include the use of such extended PANs in conjunction with physical devices, such as beacons or gates to permit authenticated access to facilities, biometric devices to identify biometrics associated with the PAN 186 for authentication by agents, not limited to merchants, and administrative structures such as web pages or computer portal screens, such as being in various languages not limited to English, for managing such extended PANs. As such, the identity of the user is embedded in the transaction data.

Figure 2:
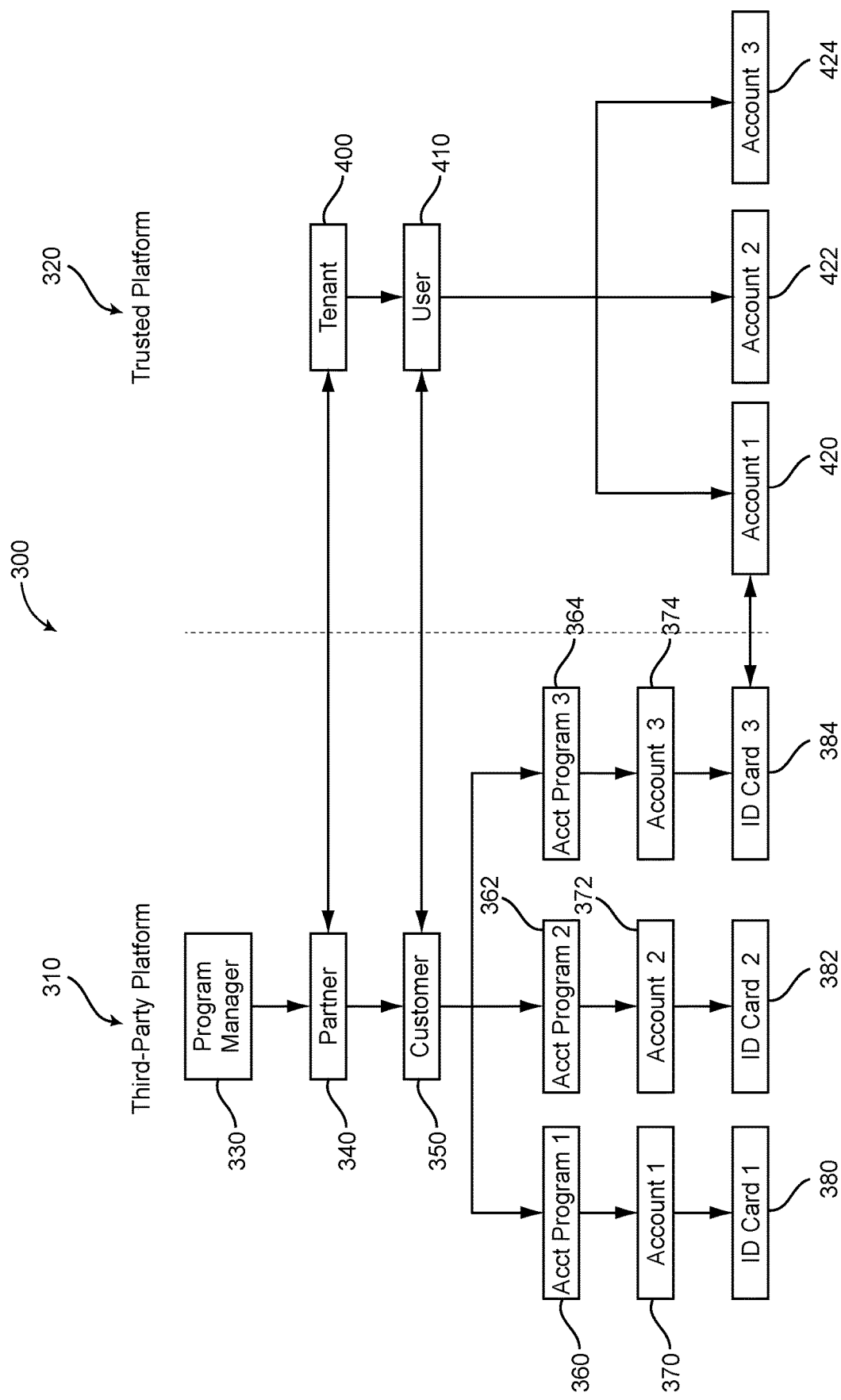
FIG. 2 illustrates an example schematic of hierarchies for account numbers and PANs of the present invention.

FIG. 2 illustrates an example embodiment of a schematic of hierarchies for account numbers and PANs, and is described in conjunction with FIG. 1, which shows the system 100 of the present invention. As such, the user 180 in FIG. 1 corresponds to a customer 350 and a user 410 in FIG. 2; and PAN 186 in FIG. 1 corresponds to ID Cards 380, 382, 384 in FIG. 2. The issuing platform for such cards 380, 382, 384 is linked to IDLOK. In alternative embodiments, the issuing platform could be a third-party issuing platform, and also may include a partner entity 190 that obtains a tokenized PAN (TPAN) 186 from the trusted platform 120.

Referring to FIG. 2, a mapping 300 is illustrated which compares the hierarchy of an issuance platform 310, which may be the partner entity 190 in FIG. 1 that issues the PAN 186 to a user, to the hierarchy of the system 320 described in application number PCT/US2016/046332, which may be implemented as a platform such as "IDLOK" available from "IPSIDY, INC.", which is implemented in the backend in the C #programming language. In addition, the IDLOK platform stores user records and PANs 186 in a database using "MICROSOFT" SQL.

As shown in FIG. 2, a program manager 330 in the issuance platform 310 includes one or more partners 340, corresponding to a tenant 400 in the IDLOK system 320. In turn, each partner 340 managed by the issuance platform 310 has one or more customers 350 or users, corresponding to the users 410 in the IDLOK system 320. Each customer/user 350 is associated with one or more account programs 360, 362, 364, with each account program 360, 362, 364 associated with one or more accounts 370, 372, 374, and in turn each account 370, 372, 374 has an associated tokenized PAN 380, 382, 384 which may be, for example, an ID number on a card as the user device 182, as shown in FIG. 1.

Each tokenized PAN 380, 382, 384 corresponds to account number 420, 422, 424, respectively, of a user 410 in the IDLOK system 320. Accordingly, the customers/users 350 of the present invention may have multiple PANs 380, 382, 384 which are tokenized for different uses not limited to financial transactions, such as using a PAN to physically access facilities as the access point such as an office; to set permissions to release personal information such as medical records to doctors; to use a PAN for commencing telephone calls; and to use a PAN to manage various accounts such as E-mail accounts, bank accounts, and medical records. In this manner, the system 100 of FIG. 1, with customers/users 350 of the present invention have multiple PANs, 380, 382, 384, is capable of interfacing and using the IDLOK system 320 described in application number PCT/US2016/046332 as a backend service for processing the PANs 380, 382, 384 of the present invention, by associating each of the PANs 380, 382, 384 with an associated account 420, 422, 424 in the IDLOK system 320.

Accordingly, the trusted platform 120 of FIG. 1 maintains and associates customers/users 350 with their identity in the user transaction data, and the trusted platform 120 operates such that the issuance platform 310 is in sync with the IDLOK system 320. As the issuance platform 310 operates to issue PANs 380, 382, 384 to customers/users, at each level in the hierarchies shown in FIG. 2, an application program interface (API) call is made in the backend of the IDLOK system 320 to create the corresponding entity in the hierarchy, and so there is a one-to-one mapping between the systems 310, 320. The API may be written in XML or SOAP programming languages. Additionally, the APIs may be implemented in PHP, Java, or the C #programming languages.

There are various types of use cases or scenarios for using the system 100, such as customer/user-triggered cases and partner/tenant-triggered case. In the customer/user-triggered case, the customer/user in FIG. 2 acts as a consumer and accesses the system 100 using any point-of-sale (POS) device, such as a reader for the card 190 to read the PAN 180 from the card 190. Alternatively, the POS may be a mobile POS (MPOS) which may access the PAN 186 when the mobile computing device 200, such as an electronic fob or dongle, cellular telephone, or smartphone, comes in range of the MPOS using, for example, Near Field Communication (NFC) protocols, WiFi, etc. Alternatively, the MPOS may be accessed anywhere in the world using known communication systems, for example, to access the PAN 186 in the user device 182 when the remote computer 220 establishes a communication session with the transaction processor 110. In this first case, the PAN is tokenized and set-up to associate the customer/user/consumer with the tokenized PAN, which will be a specific PAN used for identity transactions and not limited to payment transactions. The MPOS may be implemented as an "ANDROID"-based computing and processing platform. A POS or an MPOS is good for open routing.

Figure 3:
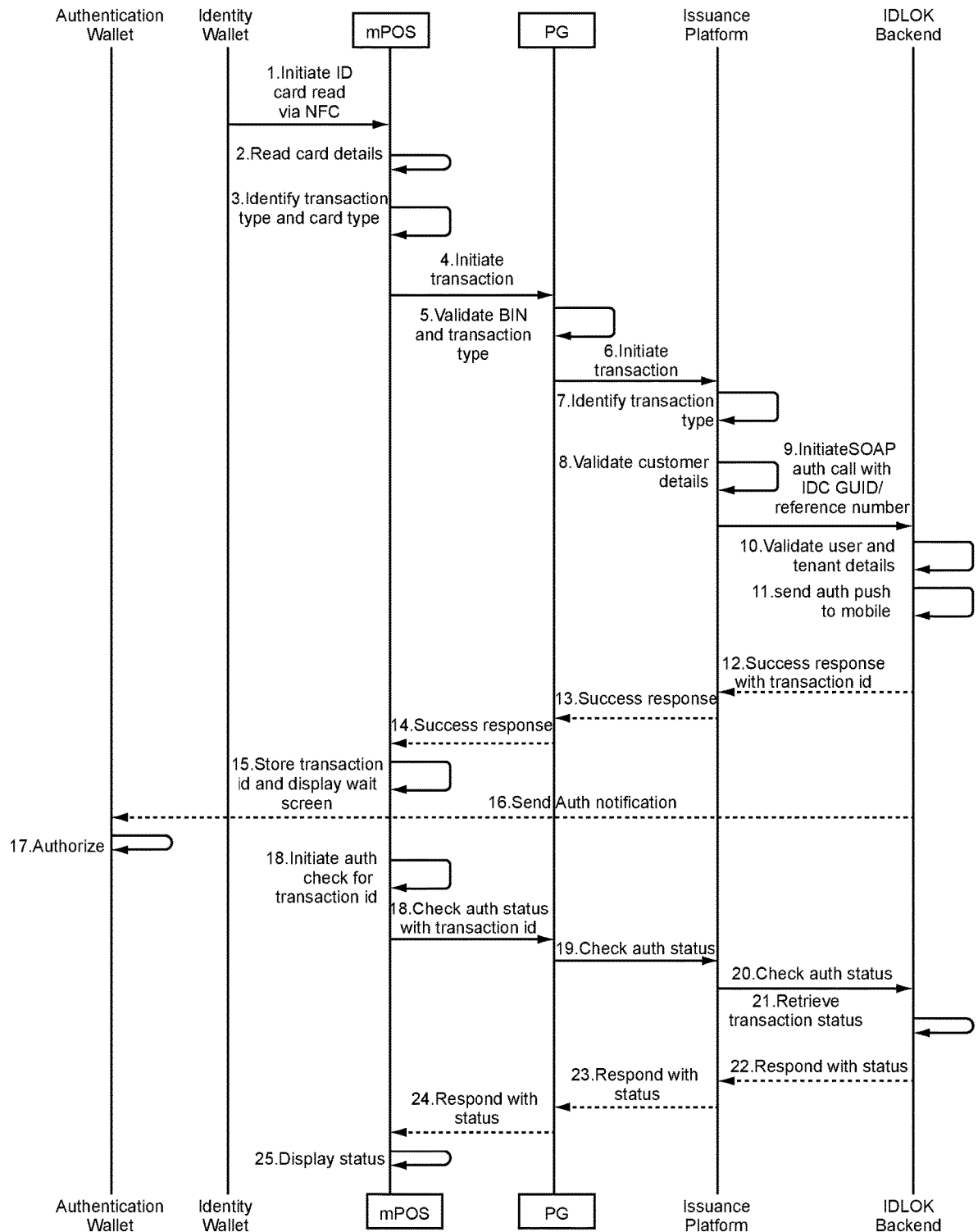
FIG. 3 illustrates a customer-triggered authentication process.

In an example embodiment, the processing of a customer/user-triggered case, performed by the IPSIDY application, is shown in FIG. 3, in which a customer/user/consumer has at least two wallets: an authorization wallet and an identity wallet. A user 180 (see FIG. 1) can have different accounts in the same identity wallet, such as for a door lock system, etc. For example, an online payments system such as Paypal can use a Reports Software Development Kit (RSDK) without the need for a trusted platform's 120 wallet, and route to the trusted platform 120 for authentication. Alternatively, Paypal can have its own system or app so their backend server triggers an app from the trusted platform 120 and routes for authentication to the trusted platform 120. The identity wallet may be any user device 182 storing the respective PANs 186 of different users, or multiple PANs of the same user, and the POS, such as an MPOS, reads the identity credential from the identity wallet in a manner described herein, such as by a card reader reading the card as a user device 182, or by a transmission from a mobile computing device or a remote computer as the user device 182. In one embodiment, an app wallet represents keys and a user can initiate a request from his/her own wallet to send information. As such, the wallet and an account in the wallet are the UI interface for the PAN owner. The wallet also holds the encryption keys, and does enrollment, downloads an app, and provides a visual representation of the accounts. The wallet communicates with a server on the platform, and the platform communicates with third parties such as a door lock system, cameras, etc., as opposed to initiating transactions from a plastic card or chip or phone that contains a PAN which initiates a transaction. Such functionality is available only to the system of the present invention which is integrated or linked with the trusted platform. Additionally, a transaction may be initiated by a PAN, by a TPAN, by a camera capturing biometric data, or other known biometric matching methods to look up and verify the identity of the user involved in the transaction.

In addition to transmitting the user transaction data to the transaction processor 110, the user accesses his identity wallet, such as electronically opening the wallet, and the user then selects an identity credential having an associated PAN 186. The user taps on the MPOS, which then detects the read credential as an identity type. The MPOS then initiates a transition with the transaction processor 110, which may be a payment gateway (PG), as in FIG. 3. The transaction processor 110 then validates the bank identification number or business identification number (BIN), and also validates the transaction type, and the transaction processor 110 then invokes a call to the authentication processor 140 of the trusted platform 120 using a predetermined protocol, such as the ISO-8583 protocol.

The authentication processor 140 validates the transaction type, and passes the card data to an issuance platform 310, which detokenizes the received PAN 186, and validates the user details. The issuance platform 310 identifies the transaction type as an identity type, and invokes an API call to the IDLOK backend system along with user details of the customer/user 350, as well as details of the partner 340 associated with the identity type. Therefore, each PAN of the present invention is tokenized and if a user loses the token, a new token can be reissued. Each PAN may also be masked for additional security benefits. For example, a user can hide the PAN by having a pseudo-PAN for extra security from third parties misappropriating valid PANs.

The IDLOK backend validates the customer and partner details, and invokes a push notification to an electronic device 182 such as the mobile computing device or the remote computer associated with the customer/user 350. The mobile computing device or the remote computer may be registered to the customer/user 350. The IDLOK backend then returns with a transaction ID sent to the issuance system 310, which in turn stores the transaction ID for status checks. The customer/user 350 then receives a push notification on his associated electronic device and the customer/user 350 opens his authorization wallet to authorize the transaction.

The MPOS then initiates an authorize confirmation message sent to the payment gateway (PG), which retrieves the status of the authorization transaction. The final authorization status may be displayed on a display associated with the MPOS. This is an example of an open loop system to manage a similar looking transaction but authenticating identity as in the present invention, instead of authenticating financial data as in the prior art.

In a partner/tenant-triggered case, the partner/tenant 340 in FIG. 2 may be a bank, a merchant, and other third-parties requiring authentication of the user. The partner/tenant 340 is operatively connected to the transaction processor 110 and sends an authentication request to the transaction processor 110, for example, in the user transaction data. In this second case, the issuance platform 310 in FIG. 2 maps the customer's identity to one or more of the accounts 370, 372, 374 using, for example, additional customer information such as a customer account number, driver's license number, employee ID, username, phone number, first and last name, etc. In an alternative embodiment, the partner/tenant 340 stores and uses customer PANs 186 to identify the customer in the user transaction data to authenticate the customer.

Figure 4:
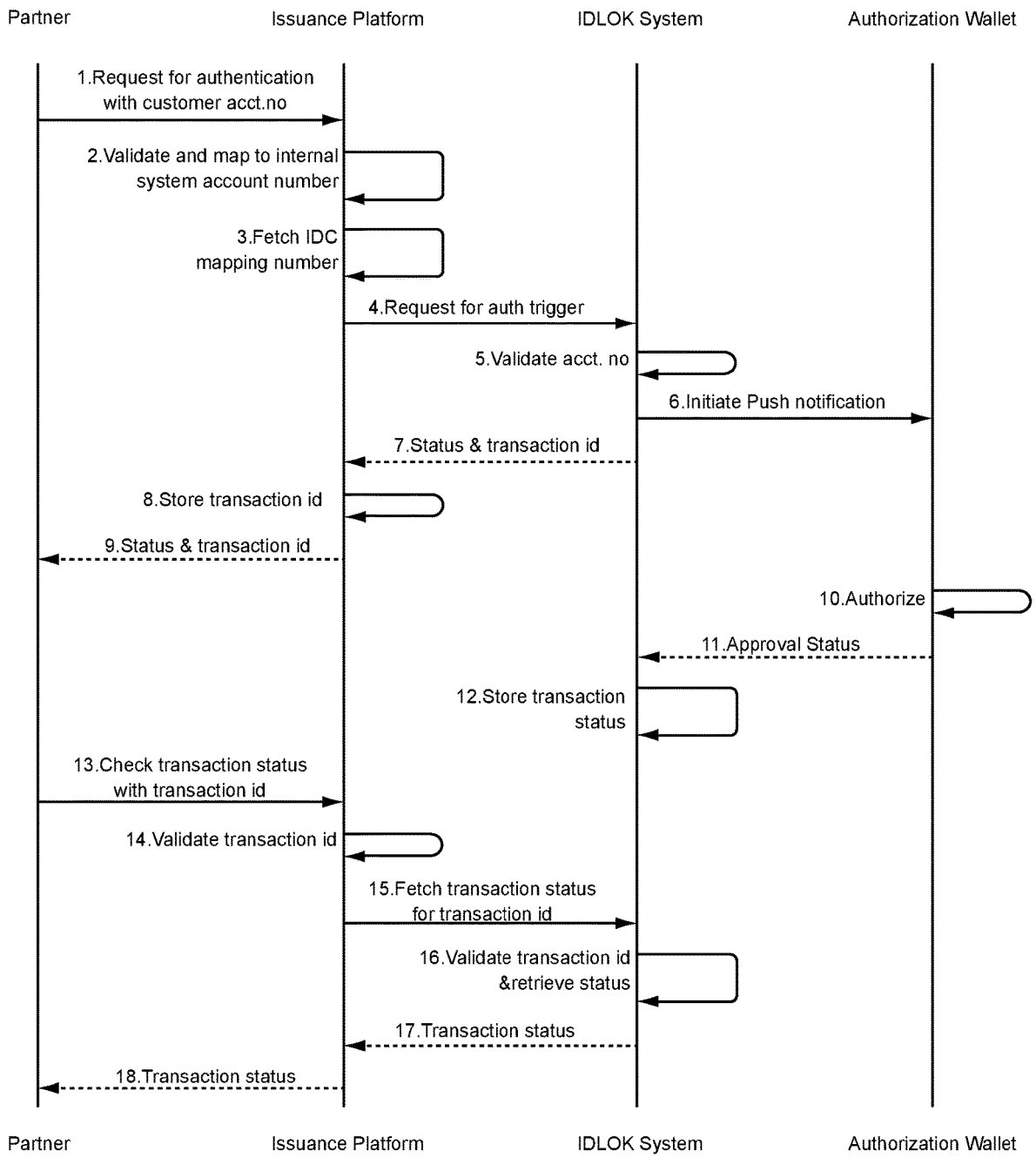
FIG. 4 illustrates a partner-triggered authentication process.

The processing of a partner/tenant-triggered case is shown in FIG. 4, in which a third-party system associated with a partner 340 requests an authentication trigger to the issuance platform 310, which utilizes a mapping between the customer's account number on the partner's system and the customer's account numbers 370, 372, 374 on the issuance platform 310. The issuance platform 310 then validates the account number 370, 372, 374, and retrieves a mapping number from the IDLOK system. The issuance platform 310 also requests an authorization trigger to the IDLOK system, which validates the request and initiates a push notification to the authorization wallet of the customer/user 350. A transaction ID is returned back to the issuance system 310 and to the partner 340. The customer/user 350 authorizes the request, and an approval status is sent back to the IDLOK system. The partner 340 initiates a transaction status with the received transaction ID, and the issuance system 310 initiates a transaction status call to the IDLOK system, which then validates the transaction ID and retrieves the status. The authorization status is then returned back to the partner 340.

Figure 5:
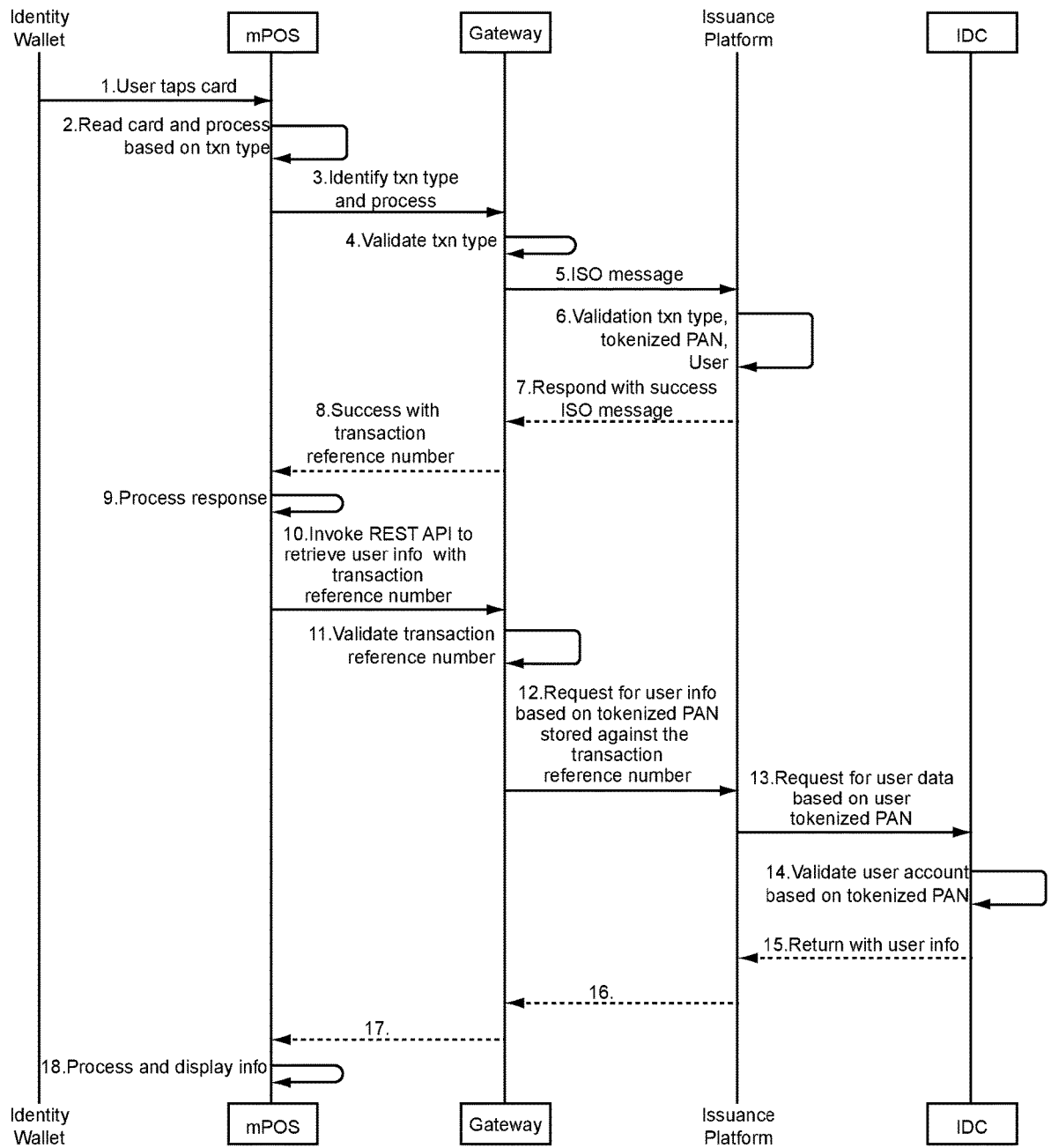
FIG. 5 illustrates a mobile point-of-sale process.

Using the system 100 in FIG. 1, a user can request his credentials for review, as shown in FIG. 5, by tapping his identity wallet accessing a POS, such as a MPOS of a merchant. For example, the user may insert his card as the user device 182 in a reader of the MPOS, or the user may place his mobile computing device as the user device 182 within communication range of the MPOS. Alternatively, the user may establish a communication link between his remote computer as the user device 182 and the MPOS. In this manner, the user requests specific identity information based on a respective PAN 186 from the user device 182.

Figure 6:
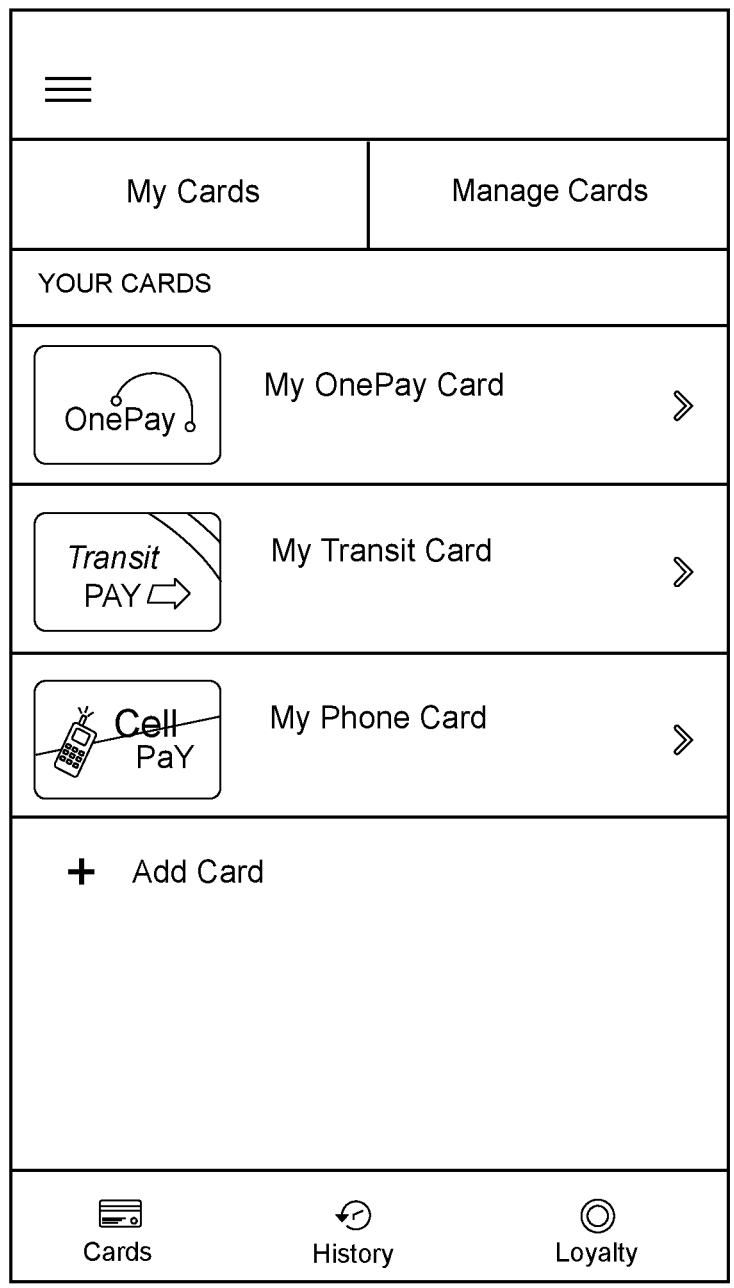
FIGS. 6-8 illustrate screenshots of a mobile device managing identities and accounts.
Figure 7:
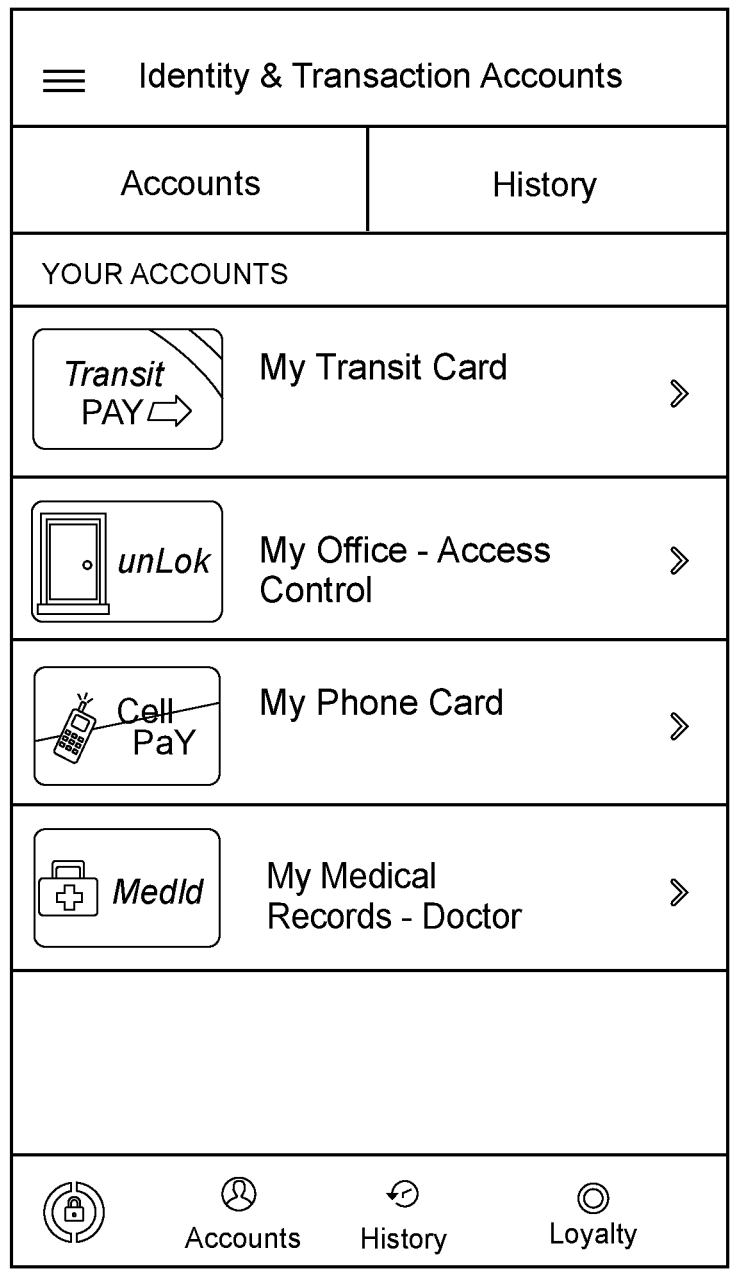

As shown in FIG. 5, the user accesses the user device 182 using an interface of the MPOS to access the identity wallet of the user. Alternatively, the user can utilize an electronic account holder or electronic wallet which authenticates and authorizes a variety of transactions, with data stored on the user device 182. As shown in FIG. 6, the user can manage, select, review, and edit data stored on various cards such as a OnePay card, a transmit card, or a phone card. In addition, as shown in FIG. 7, the user can manage, select, review, and edit various identity and transaction accounts, such as a transit card or a My Office Access Control account which control access to a facility such as a train station or an office, respectively, as access points. The user can also manage, select, review, and edit various phone cards for controlling access to telephone accounts and networks as access points.

Furthermore, as shown in FIG. 7, the user can manage, select, review, and edit various records-based accounts such as the user's medical records, for example, to grant or deny access to the user's medical records to specific doctors or medical facilities.

Figure 8:
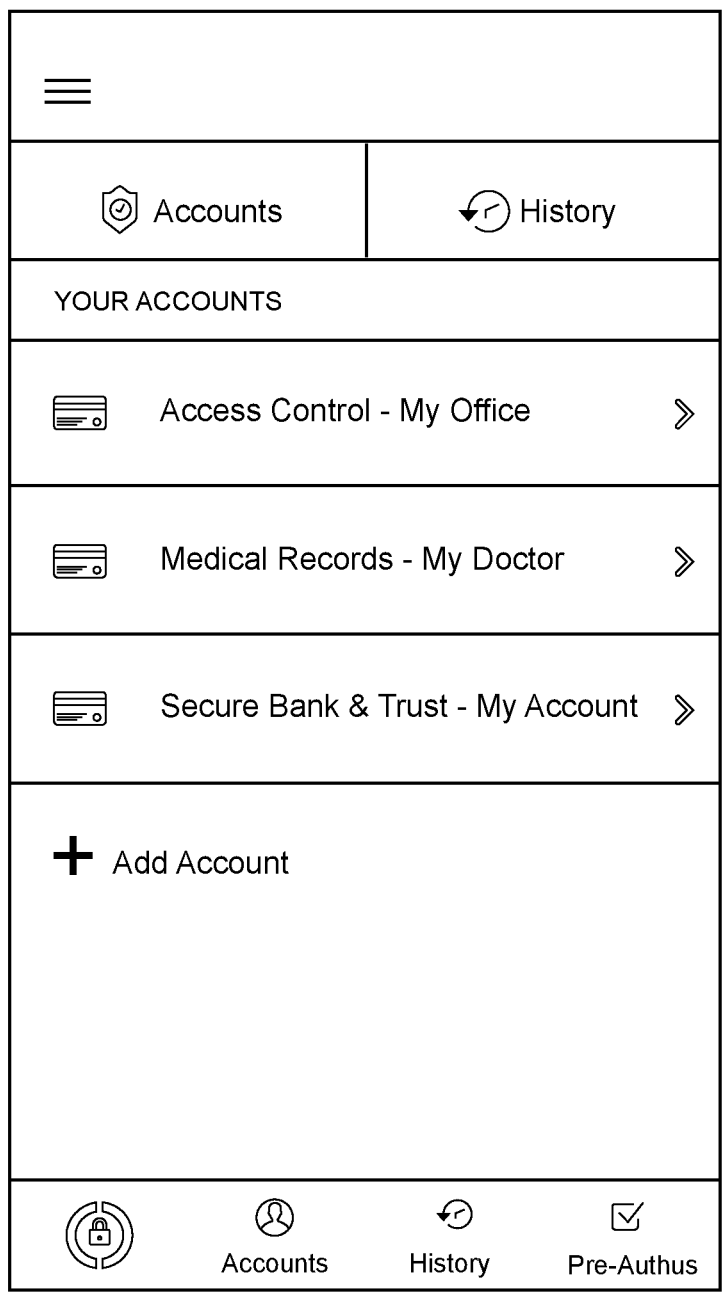

In addition, as shown in FIG. 8, the user can manage, select, review, and edit various accounts which would be subject to authentication by an identity security system, such as "IDLOK" available from "IPSIDY, INC.".

Accordingly, using the system 100 of the present invention, a user can manage accounts and identities associated with the user to be granted entry to an access point, such as transit fare kiosks, postal payments, loyalty programs, wire transfers, e-commerce applications, peer-to-peer money transfers, mobile wallets with secure mobile identities, mobile top-up and bill-paying facilities, mobile payments for suppliers, card-based and financial transaction identities of the user, and other value-added services as access points. Furthermore, the user can manage the use of his biometrics, identity, and access to elections, healthcare, and government facilities, as well as access control for both physical and digital entry points, such as border control as access points, or cloud-based or network-based entry points to data and services.

For a card as the user device 182 shown in FIG. 1, the user utilizes the MPOS interface via a card reader, allowing the user to enter personal information as specific identity information, such as the user's first and last name, home address, and/or phone number through the MPOS. The MPOS then initiates a separate transaction flow with a specific transaction type defined for identity lookup. The trusted platform 120 in FIG. 1 may function as a gateway to acquire the transaction, identity the transaction type, and pass the tokenized PAN 186 on the user device 182, to the issuance platform 310.

The issuance platform 310 validates the tokenized PAN, and responds with a validation result. If the validation result is successful, the MPOS invokes an API, such as a web-based API used by the trusted platform 120 as the gateway, to pull the identity-specific information. The trusted platform 120 as the gateway invokes an API associated with the IDLOK system to access the identity-specific information associated with the tokenized PAN, and the returned information is sent back to the MPOS through the issuance platform 310 and the trusted platform 120. The returned information is then displayed on a display of the MPOS.

Figure 9:
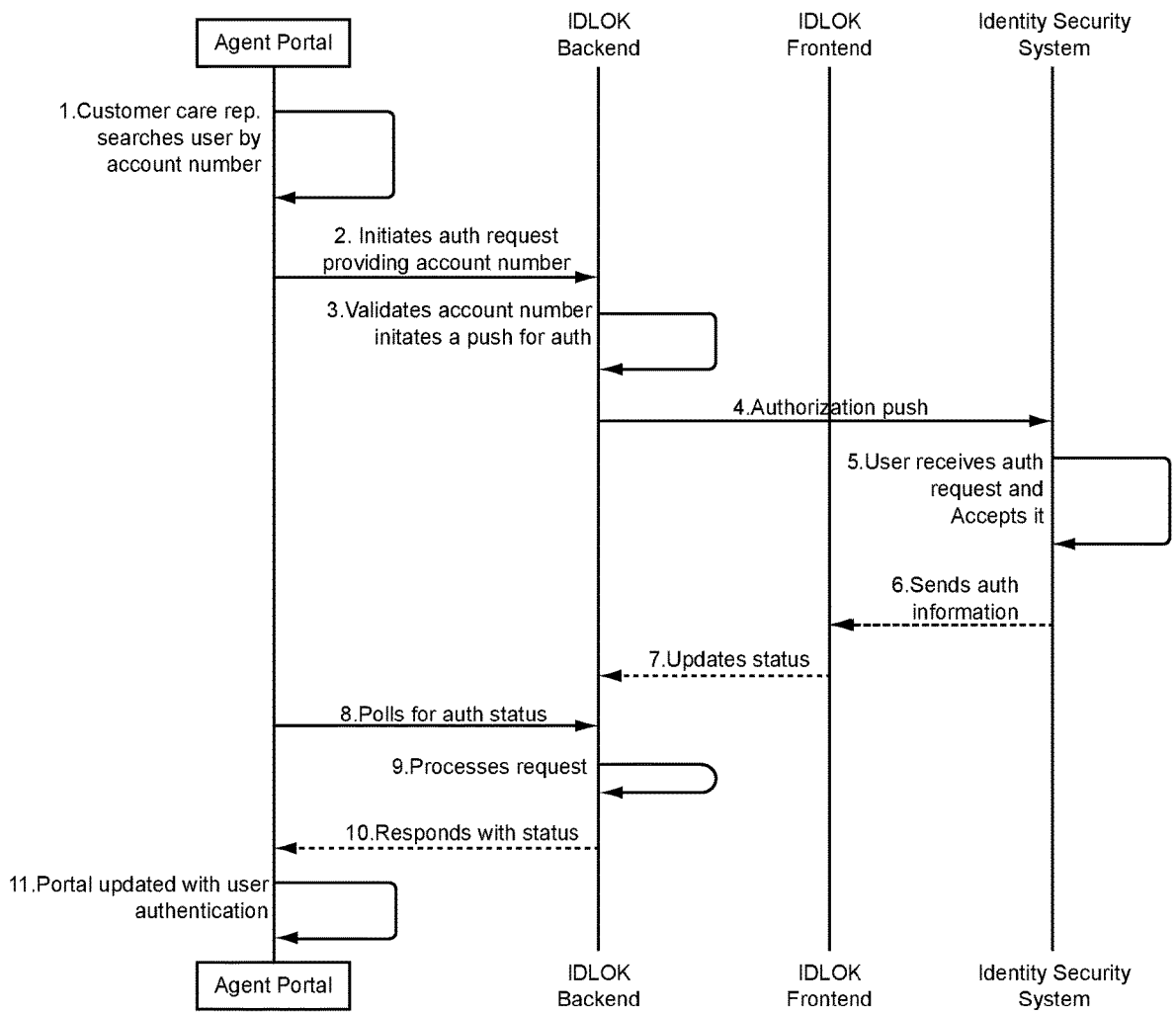
FIG. 9 illustrates a customer representative process.

The system 100 is also used at a contact center to identify a caller using an account number and/or a PAN 186, 380, 382, 384 of a customer/user 350. As shown in FIG. 9, after a customer/user 350 contacts a call center, a customer service representative uses an agent portal, or alternatively an IDLOK tenant portal, which is a portal into the IDLOK system and which is associated with a tenant 400 in FIG. 2, to verify the identity of the customer/user 350 by searching the system 100 for customer/user data, and initiating an identity authorization request. The identity authorization request is processed by the IDLOK system through its backend and its frontend to be sent to the customer/user 350. The customer/user 350 receives an authorization request through an identity security system, such as "IDLOK" available from "IPSIDY, INC.". For example, the customer/ user 350 utilizes an IDLOK mobile app or a third-party app using an IDLOK mobile software development kit (SDK) to authorize the transaction by entering a PIN, a touch-ID, and/or biometrics, with the transaction authorization sent and processed through the IDLOK frontend and backend, and the customer service representative at the call center receives the transaction authorization from the customer/ user 350 which confirms that the customer/user 350 is authenticated.

As described herein, biometrics are optionally used to increase the security of the system 100 of the present invention. In one embodiment, as shown in FIG. 1, the user provides the user biometrics 184, in addition to providing his/her PAN 186, to the authentication processor 140 which compares the user biometrics 184 with stored biometric data 170 associated with the user, and which generates the consent confirmation message to the transaction processor 110 to grant access to an access point by the user if there is a biometric match, and also based on the authentication of an appropriate PAN 186.

Figure 10:
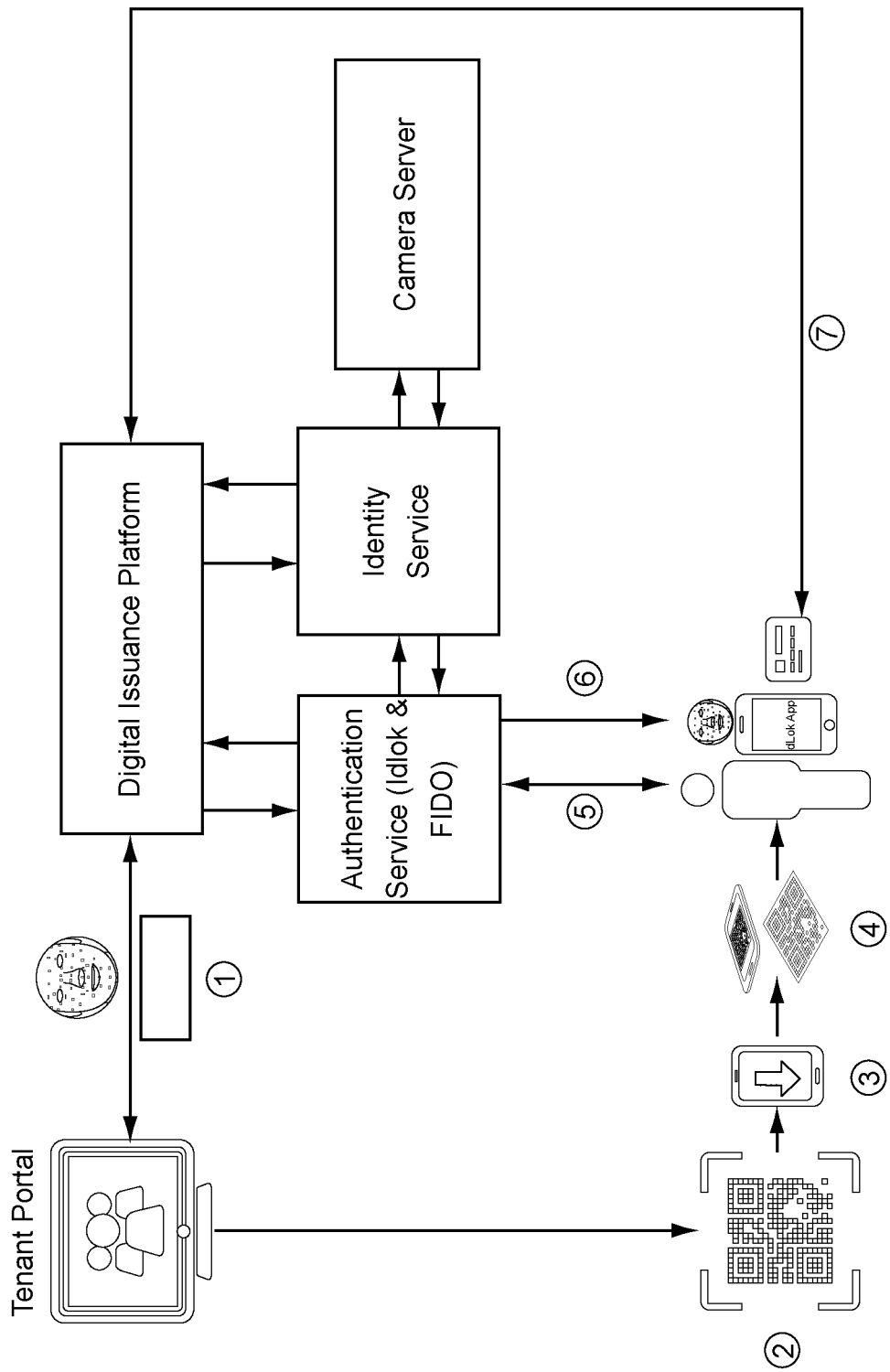
FIG. 10 illustrates a partner-based process for biometric authentication.

In an alternative embodiment shown in FIG. 10, the user boards/stores his biometric data 184, while a partner/tenant 350 in FIG. 2 provides biometrics. Referring again to FIG. 10, the partner/tenant 350 boards its users through a portal, and provides a user's partner/tenant account number, any user information needed for transactions with the partner/ tenant 350, and a facial image of the user to the issuance platform 310. The system 100 then generates an account provisioning token in the form of, for example, a one-time use QR code or a deep link in an email which is delivered to the user.

The user then downloads an imaging application or app to his user device 182 from an online database, for example, the "APP STORE" available from "APPLE INC.", and written in the "APPLE" native Objective-C programming language, or from "GOOGLE PLAY" available from "GOOGLE LLC", for use on an "ANDROID"-based programming platform, and the user signs up or otherwise registers with the downloaded imaging application. Using the imaging application, the user scans the QR code and adds the partner/tenant account. The user is then asked by the system 100 to authenticate the user using the imaging application by performing a biometric facial match in the cloud between a live-capture image taken by the imaging application and a stored reference biometric template of the user provided by the partner/tenant during enrollment of the user to use the issuance platform 310.

Upon confirmation of a successful biometric match, the system 100 sends a copy of the reference biometric template to the user device 182, so that future biometric matches are performed on the 182. The reference biometric template can be stored by the system 100 in the cloud in case a user 180 needs to provision his service to a different device 182 associated with the user 180.

The system 100 then performs future biometric authentication by storing the biometrics in a camera server, and performs further identity processing using an identity IDACS service. The system 100 also provides the user account information as unique identity accounts 370, 372, 374 with the PANs 380, 382, 384, respectively, represented by token values.

Figure 11:
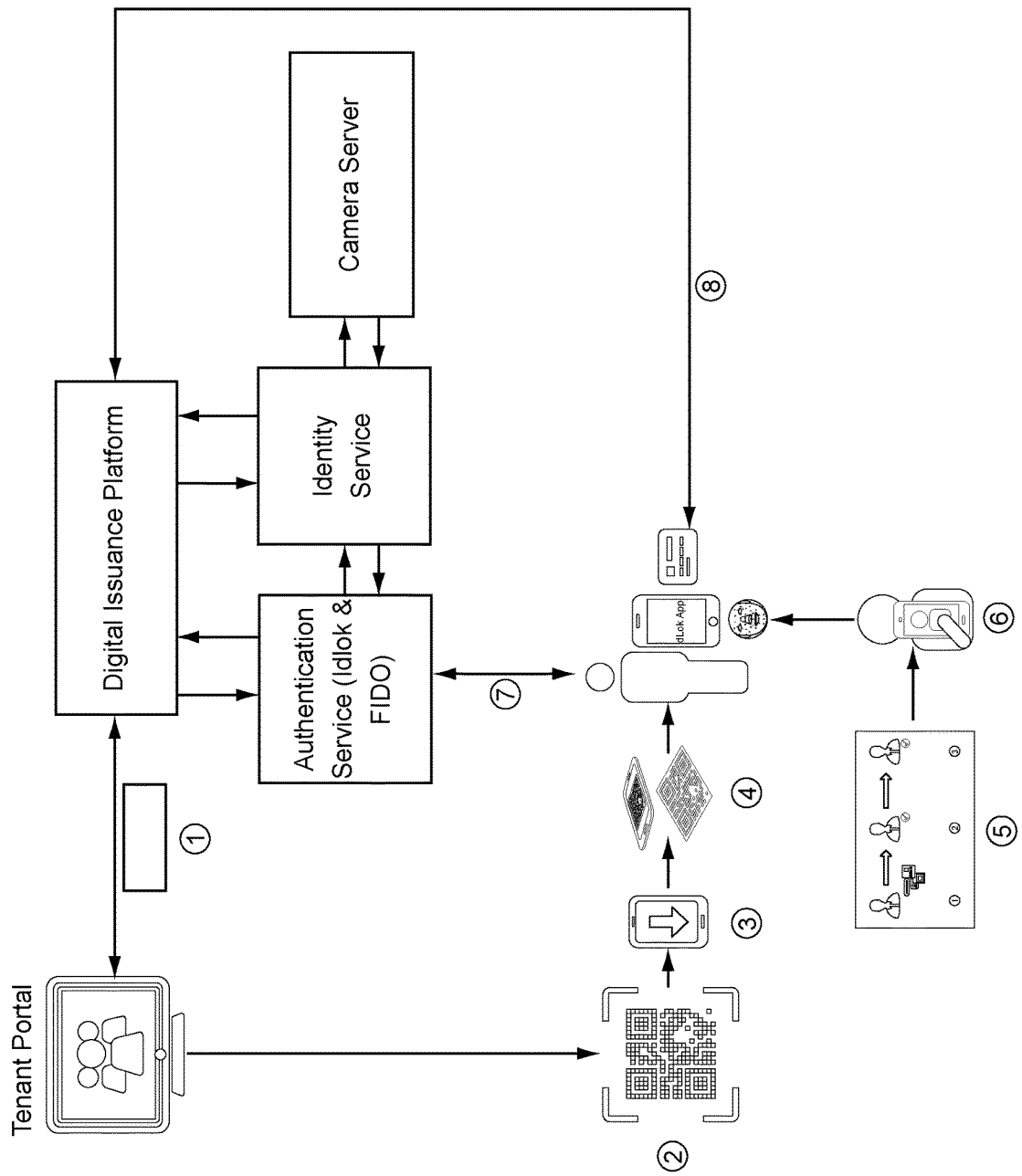
FIG. 11 illustrates a user-baser process for biometric authentication.

In a further alternative embodiment shown in FIG. 11, the user boards/stores his biometric data 184, and provides such biometrics with ID proofing. Referring again to FIG. 11, the partner/tenant 350 boards its users through a portal, and provides a user's partner/tenant account number, any user information needed for transactions with the partner/tenant 350. The system 100 then generates an account provisioning token in the form of, for example, a one-time use QR code or a deep link in an email which is delivered to the user.

The user then downloads an imaging application or app to his user device 182 from an online database, for example, the "APP STORE" available from APPLE INC., or from "GOOGLE PLAY" available from GOOGLE LLC, and the user signs up or otherwise registers with the downloaded imaging application. Using the imaging application, the user scans the QR code and adds the partner/tenant account.

The user proceeds to prove his identity by capturing the front and back of his credential, which may be a government-issued ID card, using a camera such as a smartphone's camera in the device 182 of the user 180. The imaging application confirms the authenticity of the credential, with the photograph on the credential used to verify the identity of the user.

The user then adds any additional and required information for signup, and captures a live image as a facial biometric using the imaging application, which performs biometric authentication by matching the live capture image taken by the imaging application with the photo obtained from the government-issued ID card. For example, users having e-IDs or e-passports, the ID proofing process reads a machine-readable zone (MRZ) on the e-ID or e-passport, which provides a level one key to access the user's demographic information and the facial image stored on a chip of the e-ID or e-passport. The ID proofing of the present invention would use the facial image on the chip as the reference biometric image for the boarding authentication process.

Upon the system 100 confirming a successful match from the device 182, the system 100 instructs the imaging application to store the photograph from the government-issued ID as the reference biometric template, for example, stored in the camera server. The system 100 then performs future biometric authentication from the stored biometrics in the camera server, and performs further identity processing using an identity IDACS service. The system 100 also provides the user account information as unique identity accounts 370, 372, 374 with the PANs 380, 382, 384, respectively, represented by token values.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method using a system having a transaction processor, a trusted platform, a partner entity and a user device of a registered user, the method comprising:
    generating, by the trusted platform, a primary account number (PAN) for the user, wherein the PAN uniquely identifies the user;
    sending, by the trusted platform, the PAN to the partner entity;
    assigning, by the partner entity, the PAN to the user;
    creating, by the trusted platform, an account associated with the user;
    creating, by the trusted platform, a unique cipher having a set of keys for the PAN;
    linking, by the trusted platform, using a trusted source of identification, the PAN to an attribute of the user and to the account associated with the user;
    storing, by the trusted platform, the attribute in a database;
    encrypting, by the trusted platform, the attribute using the unique cipher and the set of keys;
    sending, by the trusted platform, the set of keys to the user device;
    receiving, by the user device, the set of keys;
    removing, by the trusted platform, the set of keys from the trusted platform;
    receiving, by the user device from a third-party, transaction data and a transaction request detail;
    presenting, by the user device, the PAN to the third-party;
    sending, by the user device, the transaction data to the transaction processor using the PAN;
    receiving, by the transaction processor, the transaction data;
    identifying, by the trusted platform, the user based on the PAN;
    authenticating, by the trusted platform, the user using the linked attribute of the user;
    sending, by the transaction processor, a request to the user device to release a key associated with the transaction request detail;
    releasing, by the user device, the key;
    decrypting, by the transaction processor, the encrypted attribute using the released key;
    sending, by the transaction processor, a response including the decrypted attribute, to the third-party; and
    granting, by the transaction processor, entry of the identified user to an access point.

2. The method of claim 1, wherein the response further includes an approval message authenticating identity of the user.

3. The method of claim 1, further comprising the steps of:
    storing, in the database, by the trusted platform, identity of the user; and
    performing, by the transaction processor, a hash of the identity of the user.

4. The method of claim 1, wherein the attribute of the user is biometric data associated with the user.

5. The method of claim 1, wherein the user device is a physical card storing the PAN.

6. The method of claim 5, wherein the physical card includes readable information selected from the group consisting of embossed indicia, a recorded magnetic strip, and data stored in an electronic chip.

7. The method of claim 1, wherein the user device is a mobile computing device including a memory storing the PAN, and a transmitter transmitting the PAN to the transaction processor.

8. The method of claim 7, wherein the mobile computing device is selected from the group consisting of an electronic fob, an electronic dongle, a cellular telephone, and a smartphone.

9. The method of claim 1, further comprising the step of:
    retrieving, by the transaction processor, additional data about the user from the database.

10. A method using a system having a transaction processor, a trusted platform, a partner entity and a user device of a registered user, the method comprising:
    generating, by the trusted platform, a primary account number (PAN) for the user, wherein the PAN uniquely identifies the user;
    sending, by the trusted platform, the PAN to the partner entity;
    assigning, by the partner entity, the PAN to the user;
    creating, by the trusted platform, an account associated with the user;

creating, by the trusted platform, a unique cipher with a set of keys for the PAN;
linking, by the trusted platform, using a trusted source of identification, the PAN to an attribute of the user and to the account associated with the user;
storing, by the trusted platform, the attribute in a database;
encrypting, by the trusted platform, the attribute using the unique cipher and the set of keys;
sending, by the trusted platform, the set of keys to the user device;
receiving, by the user device, the set of keys;
removing, by the trusted platform, the set of keys from the trusted platform;
receiving, by the user device from the third-party, transaction data and a transaction request detail;
presenting, by the user device, the PAN to the third-party;
sending, by the user device, the transaction data to the transaction processor using the PAN;
receiving, by the transaction processor, the transaction data;
identifying, by the trusted platform, the user based on the PAN;
authenticating, by the trusted platform, the user using the linked attribute of the user;
sending, by the transaction processor, a request to the user device to release a key associated with the transaction request detail;
releasing, by the user device, the key;
decrypting, by the transaction processor, the encrypted attribute using the released key; and
performing an action, by the transaction processor, to identify the user, the action selected from the group consisting of sending a response to the third-party, sending an approval message, and storing an identity of the user.

11. The method of claim 10, wherein the approval message includes authenticating identity of the user.

12. The method of claim 10, further comprising the steps of:
storing, in the database, by the trusted platform, identity of the user; and
performing, by the transaction processor, a hash of the identity of the user.

13. The method of claim 10, wherein the attribute of the user is biometric data associated with the user.

14. The method of claim 10, wherein the user device is a physical card storing the PAN.

15. The method of claim 14, wherein the physical card includes readable information selected from the group consisting of embossed indicia, a recorded magnetic strip, and data stored in an electronic chip.

16. The method of claim 10, wherein the user device is a mobile computing device including a memory storing the PAN, and a transmitter transmitting the PAN to the transaction processor.

17. The method of claim 16, wherein the mobile computing device is selected from the group consisting of an electronic fob, an electronic dongle, a cellular telephone, and a smartphone.

18. The method of claim 10, further comprising the step of retrieving, by the transaction processor, additional data about the user from the database.

* * * * *